A. P. HUTCHINSON.
Sleigh.
No. 28,866.
Patented June 26, 1860.
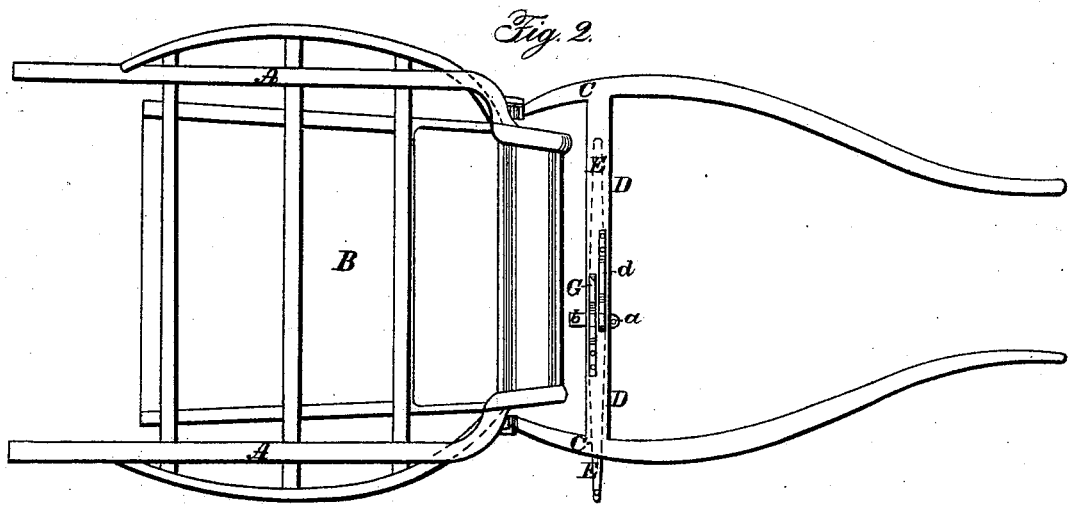
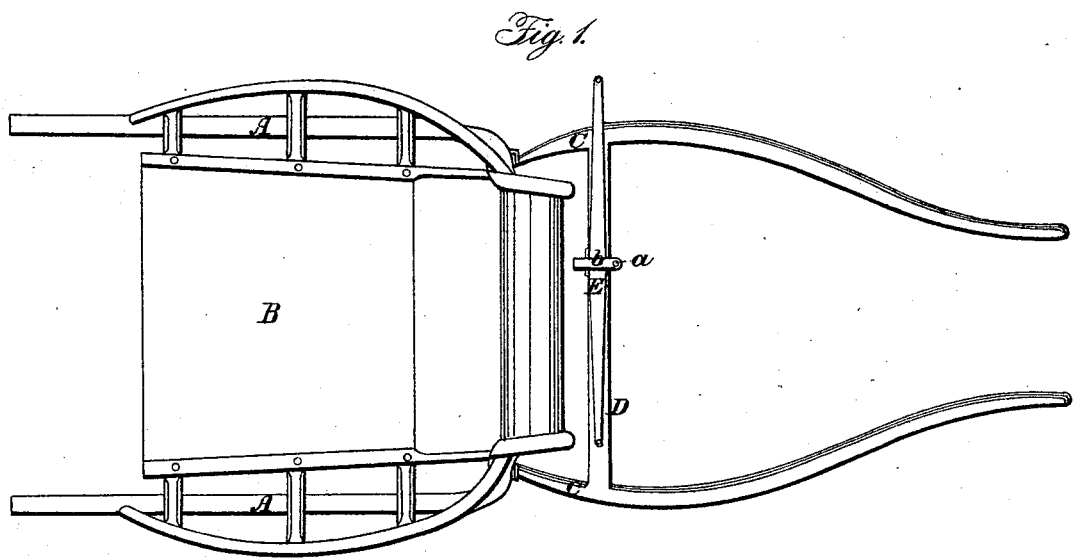
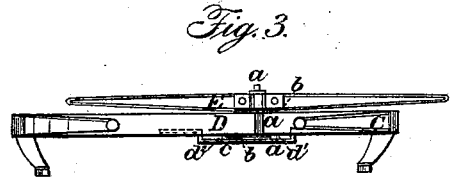
Witnesses:
R. H. Eddy
F. P. Hale Jr
Inventor:
Augustus P. Hutchinson

UNITED STATES PATENT OFFICE.

AUGUSTUS P. HUTCHINSON, OF PEMBROKE, NEW HAMPSHIRE.

ATTACHING WHIFFLETREES TO SLEIGHS.

Specification of Letters Patent No. 28,866, dated June 26, 1860.

*To all whom it may concern:*

Be it known that I, AUGUSTUS P. HUTCHINSON, of Pembroke, in the county of Merrimack and State of New Hampshire, have invented a new and useful Improvement in Sleighs or Sledges; and I do hereby declare the same to be fully described and represented in the following specification and the accompanying drawings, of which—

Figure 1, is a top view of a sleigh as provided with my invention. Fig. 2 is an underside view of the same. Fig. 3, is a side view of the whiffletree and its connections with the thill bar.

The object of my invention is to enable a horse either to track either midway between the runner tracks or in one of them.

The nature of such invention consists, first, in arranging the whiffle tree so as to project beyond one of the thills; second, in applying the whiffle tree to the thill bar by an adjustable slider or its equivalent; third, in the arrangement and combination of two spring stops with the thill bar and adjustable slider of the whiffle tree.

In the drawings, A, A, denote a set of runners, B, the platform thereof, and C, C, the thills the latter being connected in the usual manner by a crop bar D. This latter bar is the thill bar and supports the whiffle tree, E, to which the traces of the harness of a horse are to be attached when the animal is being harnessed to the sleigh.

In order that the horse may track either midway between the runner tracks of a road, when the sleigh is in use, the device by which the whiffle tree is usually connected to the thill bar is placed at the middle of such bar. In my improved application it can be moved out of this position and adjusted into another such as will cause the whiffle-tree to project over and beyond one of the shafts, or thills. For this purpose, the swivel pin, $a$, of the whiffle tree is supported by a slider, $b$, which embraces the thill bar and so as to be capable of being moved longitudinally thereon from its middle toward either one of the shafts.

Underneath the thill bar and so as to lap on the slider and lay alongside of one another, as shown in the drawings, are two spring stops, $c$, $d$, provided with heads or shoulders $d^1$ $d^2$ for the slider to rest against, the distance between each of them and the adjacent end of the other stop being equal to the width of the slider. One end of each of said stops is attached to the thill bar, the shoulder of the innermost one being so arranged as to cause the slider to be at the middle of the thill bar when such slider may be against such shoulder where it will be held in place by the extreme end of the opposite stop. In like manner, the slider may be supported against the other shoulder in which case the whiffle tree will project beyond the shaft the distance required.

As the shafts of sleighs are usually made, a horse will find little or no difficulty in adjusting his fore legs to the side track while his hind legs are therein, the runner tracks being generally a foot or eighteen inches in width.

With my improvement applied to a sleigh, a horse has been able to draw it with ease over snow, when he could not do so, when placed and made to work midway between the shafts.

I do not claim arranging both thills and whiffle tree so that their middle shall be aside of the middle line of the runners produced.

I claim arranging the whiffle tree, so as to project beyond one of the thills in manner described.

I also claim the application of the whiffle tree to the thill bar by an adjustable slider or its equivalent.

I also claim the arrangement and combination of the spring stops $c$, $d$, with the thill bar and the adjustable slider applied thereto and made to support the whiffle tree substantially as specified.

AUGUSTUS P. HUTCHINSON.

Witnesses:
AARON WHITTEMORE,
JOSIAH K. BRICKETT.